United States Patent [19]

Cagle

[11] 3,761,051

[45] Sept. 25, 1973

[54] INDUSTRIAL AIR VALVE WITH VALVE BODY HAVING FLEXIBLE SEALING LIP

[75] Inventor: Harlan R. Cagle, Clarkston, Mich.

[73] Assignee: Sahlin Engineering Company, Inc., Birmingham, Mich.

[22] Filed: Dec. 21, 1970

[21] Appl. No.: 100,471

Related U.S. Application Data

[60] Division of Ser. No. 880,061, Nov. 26, 1969, Pat. No. 3,582,039, which is a continuation-in-part of Ser. No. 639,545, May 18, 1967, abandoned.

[52] U.S. Cl. .................................. 251/63, 251/63.5
[51] Int. Cl. ........................................... F16k 31/12
[58] Field of Search ...................... 251/63, 62, 63.5; 137/625.66, 625.27, 625.25

[56] References Cited
UNITED STATES PATENTS

| | | | |
|---|---|---|---|
| 3,315,696 | 4/1967 | Hunter | 251/63 X |
| 3,166,358 | 1/1965 | Valentine | 137/625.27 X |
| 3,463,192 | 8/1969 | Herion, Jr. | 137/625.25 X |
| 3,608,587 | 9/1971 | Zbell | 137/625.66 |
| 3,118,470 | 1/1964 | Peras | 137/625.27 X |

*Primary Examiner*—Arnold Rosenthal
*Attorney*—Harness, Dickey & Pierce

[57] ABSTRACT

There is herein disclosed an industrial type air valve assembly in which poppet type valve heads have a new and improved self-compensating sealing lip and are controlled by a new and improved solenoid operated pilot valve. The pilot valve is connected to an operating solenoid in a manner providing a no-load gap between a valve stem and a valve head to reduce starting load. The valve stem is supported by plastic bearing means providing minimal frictional loading to further reduce starting load. The valve stem and valve head cooperate to provide variable force transfer surfaces whereby pressure forces opposing movement of the solenoid armature are varied from a minimum pressure force prior to opening of the valve providing minimum resistance to the armature to a maximum pressure force immediately after opening of the valve to decelerate the armature to an intermediate pressure force to brake the armature as it bottoms.

2 Claims, 4 Drawing Figures

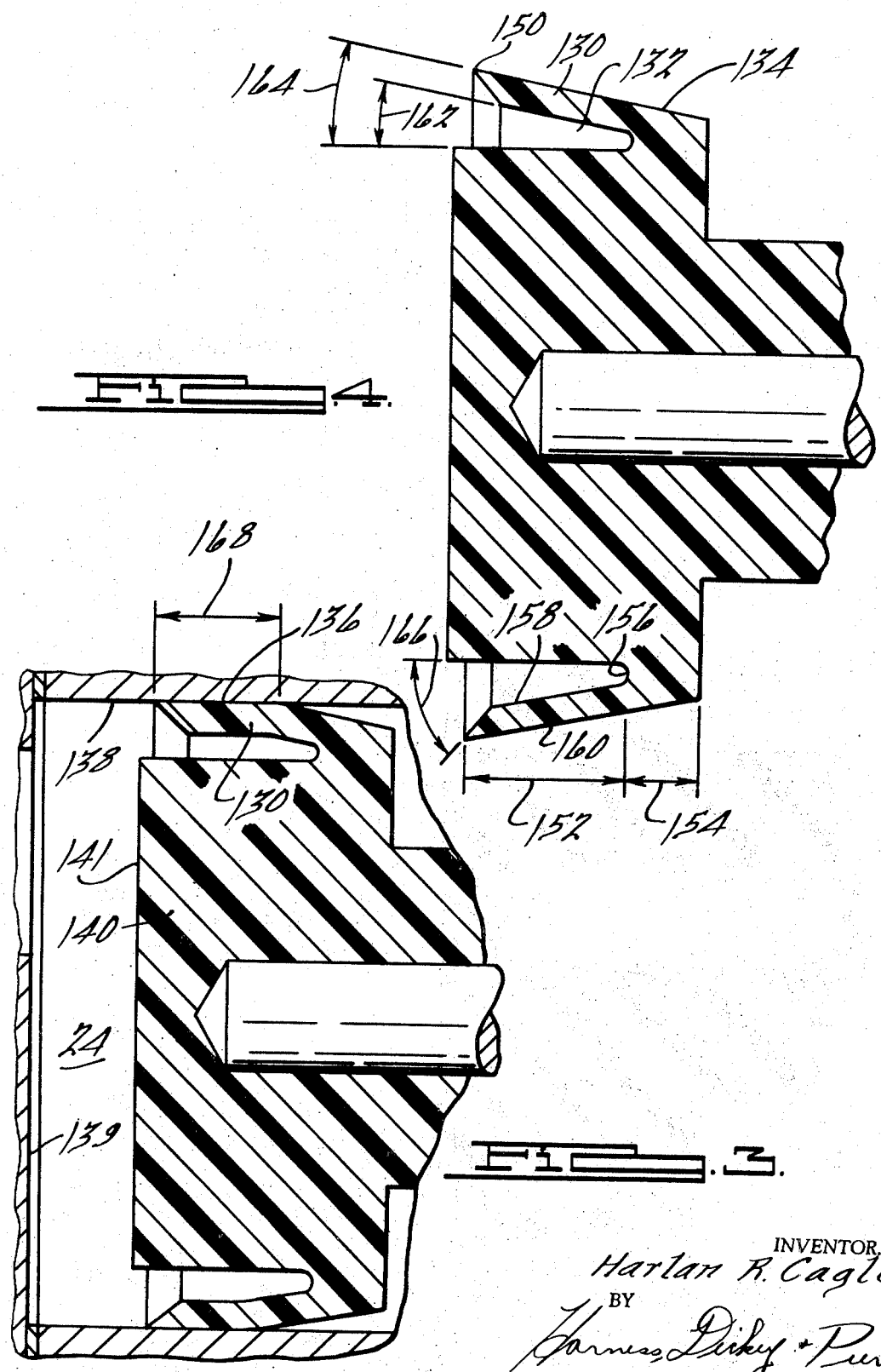

3,761,051

INDUSTRIAL AIR VALVE WITH VALVE BODY HAVING A FLEXIBLE SEALING LIP

BACKGROUND AND PRIOR ART

This application is a divisional of my copending application Ser. No. 880,061 filed Nov. 26, 1969 now U.S. Pat. No. 3,582,039, which is a continuation-in-part of my prior application Ser. No. 639,545 filed May 18, 1967, and now abandoned.

In the prior art, poppet valves and solenoid operated pilot valves have been widely used in applications requiring relatively few cycles of operation. In adapting prior art poppet valves and solenoid operated valves to usage in an air control valve unit of the type described in U.S. Pat. No. 3,474,825 with swinging arm press unloading apparatus of the type disclosed in U.S. Pat. No. 2,609,776, I have found that the fast operation and repetitive cycling to which these valves are subjected causes excessive failures in both the valving and the electrical components. In particular, the poppet valve heads, the pilot valves and pilot valve bodies, and the pilot valve operating solenoids have presented wear problems.

The unloading apparatus comprises a swinging arm which carries an air actuable jaw device between a lowered position adjacent a press cavity and a raised position located upwardly and outwardly from the press. The swinging arm is moved from the lowered position to the raised position by a single acting air operable power cylinder to which high pressure air is selectively directed. The swinging arm is lowered at a controlled rate as the high pressure air is exhausted from the cylinder. The jaw carried by the swinging arm is positively closed and opened, to grip and release a workpiece, by means of a double acting air operable power cylinder to and from which high pressure air is selectively directed and exhausted to obtain the opening and closing movements of the jaw. Ordinarily, with the swinging arm initially in the lowered position, the operational sequence is: (1) extend and close jaw to grip workpiece, (2) swing arm upwardly and carry workpiece from press, (3) open jaw to release workpiece, and (4) return arm to lowered position.

The air control valve unit is connected to a single high pressure air line, extending from a source of high pressure air, through a common inlet chamber in a valve housing containing an inlet and exhaust valve assembly for the single acting arm cylinder, an arm cylinder speed control valve, and a pair of inlet and exhaust valve assemblies for the double acting jaw cylinder. These valve assemblies are sequentially operated to control flow of high pressure air from the common inlet chamber to the arm cylinder and the jaw cylinder to effect the aforedescribed operational sequence.

The unloading device and associated valving are primarily utilized in large factories which have a conventional industrial type high pressure air supply. Such an air supply is subject to variations in pressure. It is common design practice to assume variations of between approximately 40 psi and 150 psi. Industrial air valves are commonly designed for operation with lubrication supplied by an oil mist introduced in the air upstream of the valve by special lubrication apparatus. One type of failure of industrial valves is from lack of proper lubrication which may result from failure to replenish oil in the special lubrication apparatus or by failure of the lubrication apparatus itself. Of course, failure of industrial valves is highly objectionable not only because of the cost of maintenance or replacement but also because of the resulting interruption of production.

In the prior art, industrial air valves of the present type have been rated as having approximately a 10 to 14 million cycle life expectancy while the solenoids utilized to operate the pilot valves have been rated as having approximately a 5 to 10 million cycle life expectancy. In actual practice, many of these valves and solenoids fail far in advance of the expected life expectancy.

SUMMARY OF INVENTION

It is the primary purpose of this invention to provide a new and improved industrial air valve including an electrically operated pilot valve assembly for use with apparatus repetitively cycled through relatively short operational cycles over long periods of time.

I have discovered that many industrial air system parts requiring sealing means, such as valve heads, plugs, plates, bearings, end walls, and pistons, heretofore made of machined metallic parts and mounting separate sealing means, such as O-rings, packings, wipers, and the like, may be advantageously made in one piece from a plastic material such as a fluorocarbon polymer. Furthermore, in adapting one-piece plastic parts for use in industrial air systems, I have discovered that exceptionally effective seals can be provided by integrally forming air pressure actuable sealing lips on a one-piece part in a new and improved manner providing for self-compensation for wear in use over exceptionally long periods of time.

The invention further resides in the provision of a solenoid operated valve in which the number of parts is greatly reduced, the starting force on the solenoid is greatly reduced, the friction load on the solenoid is greatly reduced, and resistance to bottoming of the solenoid is minimized while reducing the bottoming force. Furthermore, new and improved mounting means have been provided and a manual operator has been incorporated with the solenoid apparatus. As a result of this invention, a solenoid controlled industrial air valve has been provided which will operate in excess of 70 million cycles without failure.

BRIEF DESCRIPTION OF DRAWINGS

FIG. 3 is an enlarged view of the poppet valve portion of the apparatus shown in FIG. 1; and FIG. 4 is an enlarged view of the poppet valve of FIG. 3 disassociated from the valve bore.

DETAILED DESCRIPTION

Figure 1:
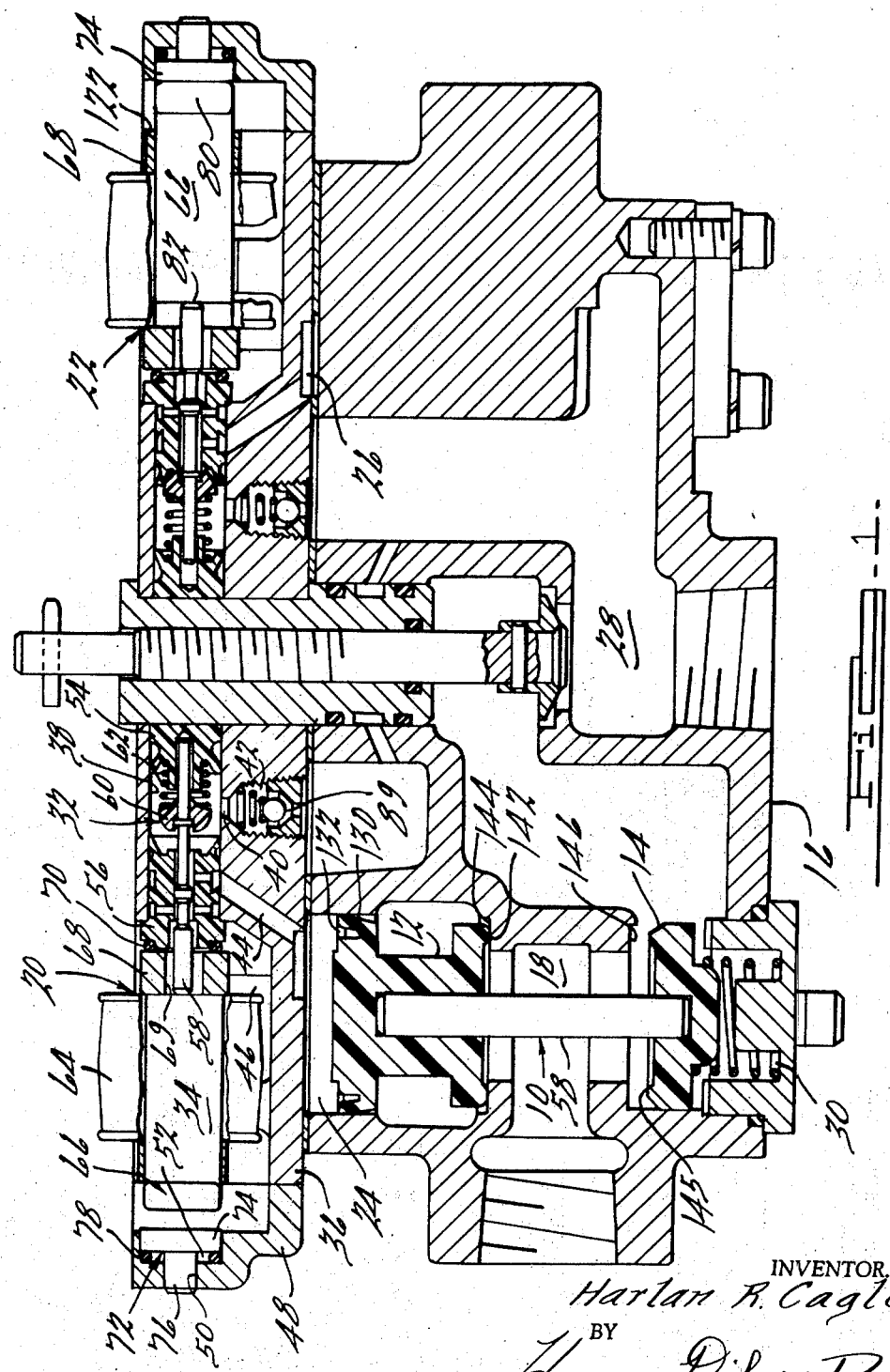
FIG. 1 is a side elevational view, in section, of a control valve assembly incorporating the inventive features.

Referring now to the drawings, a control valve unit of the type disclosed in U.S. Pat. No. 3,474,825 illustratively embodies the inventive features. In general, a control valve assembly 10 comprising poppet valve head portions 12, 14 is mounted in a valve housing 16 for movement of the valve heads between open and closed positions relative to an inlet-exhaust chamber 18. The general operation of these valve assemblies will be understood by those skilled in the art to which this invention relates and are described in further detail in U.S. Pat. No. 3,474,825 and hereinafter only to the extent required for an understanding of the present invention. Suffice it to say that the control valve assemblies control flow of high pressure air to and exhaust air from opposite ends of air operated power cylinders and are alternately actuated between inlet and exhaust positions.

Control valve assembly 10 comprises spaced valve head members 12, 14 interconnected by a valve steam 58 so as to be operable as a unit between an inlet position, FIG. 1, whereat high pressure air is delivered to the associated power cylinder and an exhaust position (not shown) whereat high pressure air is exhausted from the associated power cylinder. Movement of the valve assembly 10 is controlled by a pilot valve assembly 20. An identical pilot valve assembly 22 controls movement of similar control valve assemblies (not shown). The pilot valve assemblies are electrically operable to alternately connect pressure chambers 24, 26 to a source of high pressure air in chamber 28 and to exhaust whereby the control valve assemblies are alternately moved by high pressure air in the pressure chambers between exhaust and inlet positions. Valve assembly 10 is shown in the inlet position with valve head 12 seated and valve head 14 open. Spring means 30 bias the valve assembly to the exhaust position (not shown) whereat valve head 12 is opened and valve head 14 is seated.

Since the electrically operable pilot valve assemblies are identical, the reference numerals are hereinafter applied to one or the other but not to both and it will be understood that each reference numeral is equally applicable to the corresponding part in the assembly not designated. Pilot valve means 32 and operating means 34 are mounted in a housing 36 having a valve bore 38, an inlet passage 40 and check valve chamber 42, an inlet-exhaust passage 44 connected to pressure chamber 24, and a solenoid cavity 46. An end plate 48 having a manual operator bore 50 and cushion chamber 52 is adjustably fastened to the valve housing by threaded fasteners (not shown) to secure the parts in the positions shown. The pilot valve means comprises a combination bearing and end plug and sealing means member 54, a combination bearing and end plug and sealing means and valve body member 56, a combination operator rod and valve stem 58, a valve head member 60, and a compression spring 62. The operating means comprises an armature coil 64 and an armature member 66 mounted in an armature frame 68. A bore 69 in the frame receives the rod 58. A resilient O-ring member 70 separates the member 56 and the armature frame 68 and acts as a vibration cushion. A manual operator member 72 having an abutment plate portion 74 and a push pin portion 76 is spaced from end plate 48 by a resilient O-ring member 78 which also acts as a vibration cushion.

Figure 2:
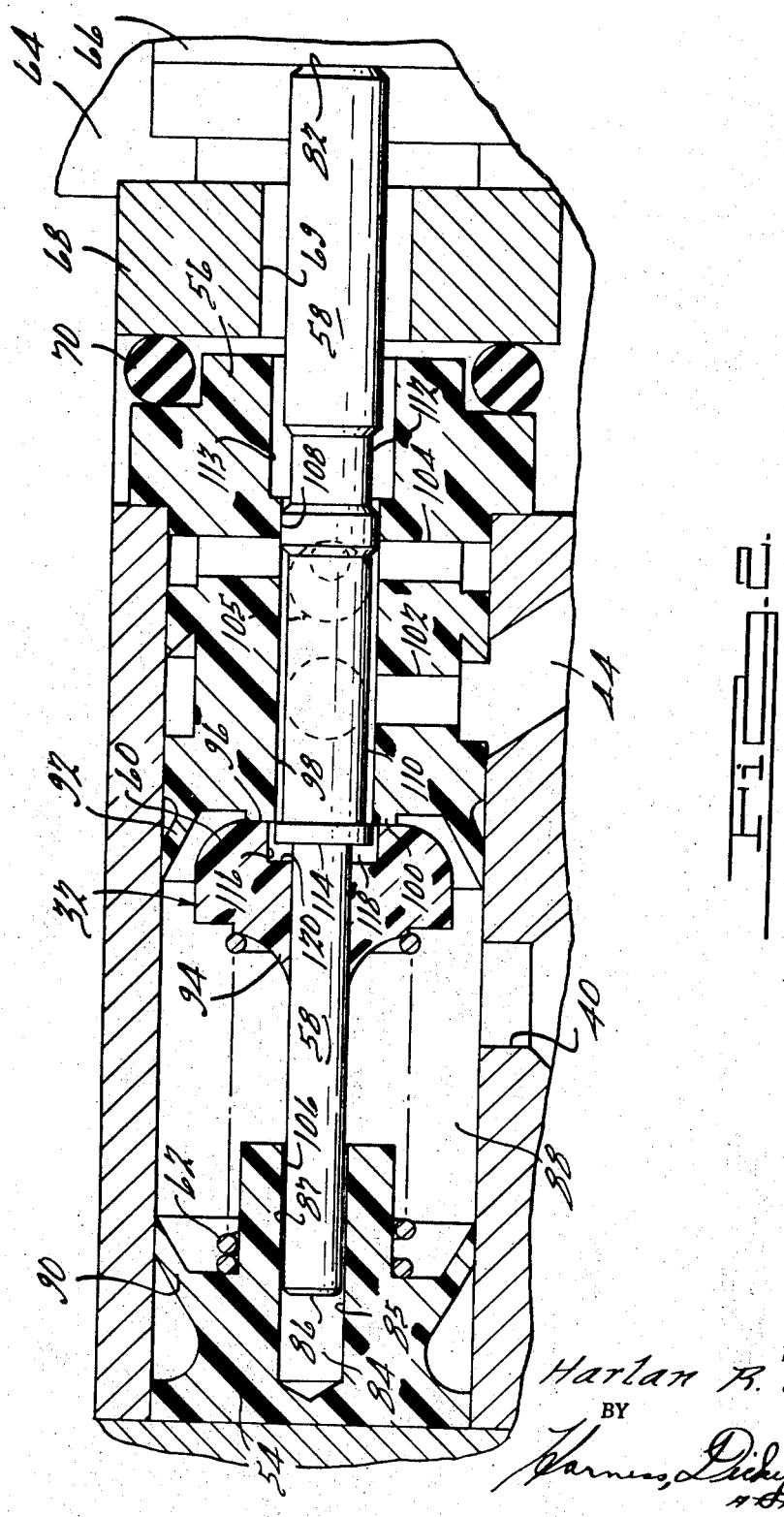
FIG. 2 is an enlarged view of the pilot valve portion of the apparatus shown in FIG. 1.

In the normal position, shown by assembly 22, the armature is located in an extended position with an abutment plate portion 80 in abutting engagement with abutment plate portion 74 of the manual operator. Referring now to FIG. 2, one end 82 of valve stem operator rod 58 abuts the armature 66. High pressure air (e.g. 80 psi in the illustrative embodiment) in a rod chamber 84 formed by a bore 85 in the end plug 54 acts on the end 86 of the rod to bias the rod and the armature to the extended position. Rod chamber 84 is connected by a passage 87, formed between the rod 58 and the wall of the bore 85 by the clearance (exaggerated in FIG. 2 for purposes of illustration) of a sliding fit, to an inlet chamber 88 between end plug portions of members 54, 56. Thus, the rod chamber 84 is the same as the inlet chamber with respect to the force effect of the high pressure air on the rod 58 which may be slidably supported in bore 85 or by any other suitable means. The high pressure in the rod chamber 84 and inlet chamber 88 is derived from a high pressure source (not shown) through inlet chamber 28 in valve housing 16, a check valve 89, and inlet passage 40. Sealing lips 90, 92 on the end plugs and sealing means 94, 96 on the valve head 32 close chamber 88 in the normal position. High pressure air in chamber 88 and compression spring 62 hold the valve head in a closed position relative to a passage 98 in a portion of member 56 and seated on an undercut valve seat 100. Passage 98 connects pressure chamber 24 via a passage 102 to an exhaust passage means 104, 105.

When coil 64 is energized, armature 66 is moved from the extended position shown by assembly 22 to a retracted position shown by assembly 20. Simultaneously, the rod 58 is moved from the extended position to the retracted position due to abutting engagement with the armature at 82. Rod 58 is slidably supported in bearing portions of the members 54, 56, which are formed by the bores 85, 98, by an end portion surface 106 and an intermediate narrow width surface 108. The length of these surfaces are minimized to reduce friction. The length of surface 106 is such as to provide sliding support throughout movement of the rod and the length of surface 108 is such as to open exhaust port 105 in the extended position and to close the exhaust port in the retracted position. The reduced diameter portions of the rod 110, 112 adjacent the surface 108 and the enlarged portion 113 of bore 98 serve to reduce sliding friction.

An abutment flange 114 is provided on the rod to engage the valve head and move the valve head to the open position against the bias of compression spring 62 and high pressure air in chamber 88. A flange chamber 116 is formed in the valve head and has a depth substantially greater than the width of the flange so as to provide a substantial gap 118 between the valve head and the flange in the extended position. Thus, the rod and armature are moved a substantial distance under minimum load at the beginning of movement. This arrangement may be referred to as a no-load gap means which in effect provides lost motion means between the rod and the valve head. The only load is that caused by the force of the high pressure air in chamber 84 against the end of the rod (e.g. approximately ½ lb. in the illustrative embodiment), frictional force between the rod and the valve head, frictional force between the rod surface 106 and member 54, and frictional force between the rod surface 108 and the member 56. When the flange 116 engages the valve head surface 120, the additional load caused by the compression spring (e.g. approximately ½ lb. in the illustrative embodiment) and high pressure air (e.g. approximately 3 lb. in the illustrative embodiment due to 80 psi air pressure acting through a relatively narrow annular sealing surface on the valve head in engagement with the valve seat) acting on the valve head is encountered. Valve head 60 is moved to the open position to connect inlet chamber 88 to passage 44. Simultaneously, the exhaust passage means 104 is closed so that high pressure air is delivered to the pressure chamber through passage 44. When the solenoid coil is de-energized, spring 62 is effective to move the valve head to the closed position. Movement of the valve head simultaneously moves the rod toward the extended position due to engagement of surface 120 with flange 114. Also, the armature 66 is simultaneously moved toward the extended position due to engagement of the end of the rod 82 with the end of the armature. When the valve head 60 seats on the valve seat 100, the momentum of the rod and high pressure air, acting in chamber 84 on the end 86 of the rod, move the rod and armature to the fully extended position and establish the no-load gap 118 between the valve head and the flange.

One of the advantages of the present structure is that wear between the abutment plate portion 80 of armature 66 and the armature frame 68 is greatly minimized. As is conventional, the abutment plate portion 80 bottoms against the armature frame at 122 in the fully extended position. In conventional valve designs, the armature bottoms with such force as to cause extensive wear and eventual failure of the solenoid. The reason for the reduction in wear and hence increased life of the solenoid in the present structure appears to reside in the pilot valve design which reduces the bottoming force. As may be seen by reference to FIG. 2, the armature 66 starts under essentially no-load conditions due to the gap 118 between flange 114 and shoulder 120 as previously described. The only force resisting movement of the rod 58 and armature 66 is that caused by the high pressure air in chamber 84 against the end of the rod and by friction between the rod and the valve body which is quite small. When the rod flange 114 engages the valve shoulder 120, the armature and valve rod are traveling at maximum velocity with maximum force. The arrangement is such that maximum load is applied to the armature 66 upon engagement of rod flange 114 with valve shoulder 120. The maximum load is equal to the pressure in chamber 88 acting on the sealing surface area as measured by the diameter of surfaces 96, 100 and the force of compression spring 62. However, the maximum pressure force is only momentarily applied through the valve head because as soon as the valve opens there is pressure equalization relative to the valve head. The velocity of the armature and its energy is substantially reduced by the maximum pressure force as the valve opens. Thereafter, another lesser pressure force is applied through the valve rod as measured by the diameter of the sealing surface 108. The result is that the maximum force of the solenoid armature is utilized to open the valve and much of the remaining force of the armature is dissipated before bottoming. In effect, the pressure force varies in accordance with the variations in diameter of the rod end 86, the sealing shoulder 100, and the sealing surface 108. In the presently preferred form of the invention, these diameters are approximately three thirty-seconds inch, one-fourth inch, and five thirty-seconds inch, respectively, so that in operation a relatively small pressure surface is effective prior to opening of the valve, a relatively large pressure surface is effective immediately upon opening of the valve, and a pressure surface of intermediate size is effective after opening of the valve to further retard the armature movement and reduce bottoming force. The advantage of the apparatus is that a solenoid of smaller force may be utilized to open the valve and as a result of the smaller force and the dissipation of force after opening of the valve, but prior to bottoming of the armature, there is substantially less wear on the armature and armature frame. Assuming 100 psi in the pressure chamber 88, the air pressure forces opposing movement of the armature in the preferred embodiment are 0.69 pounds when the valve is closed, 3.76 pounds upon opening of the valve, and 1.92 pounds after opening of the valve or a pressure variation ratio of approximately 1:5:3. Thus, pressure differential permits opening of the valve with minimal force, substantially shows the armature during opening of the valve, and then brakes the armature prior to bottoming. With the present design a solenoid rated for a much lesser maximum opening force may be utilized. In the presently preferred embodiment, a Model 02 Industrial Grade Solenoid rated at 5.5 pounds at O stroke, as manufactured by Detroit Coil Company under U.S. Pat. Nos. 2,466,592; 2,665,397; 2,671,187; 3,017,547; and 3,195,024 is employed as the electro-mechanical actuator. While solenoids of this general type have heretofore probably had a life expectancy of between 5 and 7 million cycles in the aforedescribed environment, such solenoids have been operated more than 70 million cycles without failure in association with the present valve design.

Tests of the pilot valve have shown that maximum wear tends to occur between the surface 108 and the bore 98 on opposite sides of the exhaust passage 104. This wear may be substantially reduced by making the member 56 from a conventional glass filled fluorocarbon resin (e.g. Teflon) in which the filler comprises one or more additives such as 15–20 percent glass fibers and 5 percent graphite or molybdenum disulfide.

Another feature of the air valve of the present invention is incorporated in the control valve assemblies by providing one-piece annular valve head members 12 formed of plastic material and having integral sealing means. The plastic material is a low water absorption, high wear resistant material having a low coefficient of friction and good machining characteristics. The material is rigid in thick sections but has sufficient flexibility in thin sections to permit high pressure fluids to deflect thin sections and create fluid seals with adjoining surfaces. Fluorocarbon polymer plastic materials such as tetrafluoroethylene polymer and fluorinated ethylene-propylene polymer appear to be particularly well suited for this purpose. Teflon material as manufactured by the E. I. DuPont Company has proved satisfactory. The presently preferred material is a commercially available mixture of the polymer and approximately 15 to 20 percent glass fibers with 5 percent graphite or molybdenum disulfide.

The sealing means takes the form of a generally axially extending, flexible, annular, sleeve-like lip 130 formed by an undercut annular groove 132 extending generally axially into the valve body and having a tapered outer side surface 134 outwardly inclined relative to the longitudinal axis of the valve and providing an outer sealing surface band 136 of substantial axial length toward the end of the lip.

The valve bore 138 is a relatively smooth cylindrical surface which slidably receives the valve head 12. A traverse wall 139 extends across one end of the valve bore. The upper portion 140 of the poppet valve 12 provides a transverse abutment surface 141 which acts as a piston in pressure chamber 24 and extends axially beyond the sealing means to prevent engagement between the sealing lip and the end wall 139. When high pressure air is supplied to the pressure chamber, the high pressure air acts on the valve head to move it parallel to the longitudinal axis of the valve bore against the associated spring 30 to seat a sealing rib 142 on an adjoining valve seat 144 and to move a sealing rib 145 off of its adjoining valve seat 146.

High pressure air in the pressure chamber also acts in the undercut groove 132 on the sealing lip 130 to force the sealing surface band 136 of the lip into sealing engagement with the adjoining wall 138 of the pressure chamber. The force exerted on the valve head by the high pressure air causes the sealing surface of the sealing rib 142 to sealingly engage the adjoining valve seat surface. When the valve head is moved in the opposite direction by the spring 30, a similar sealing engagement is effected between the sealing surface of the sealing rib 145 and the adjoining valve seat surface 146.

In the presently preferred embodiment in the unflexed unstressed condition of the poppet valve head 12 as shown in FIG. 4, the maximum outside diameter as measured at the outer edge 150 of the flexible lip is 1.110 ± .002 inch. The axial length of the groove 134 as measured at 152 is nine thirty-seconds inch and the axial length of the base of the lip as measured at 154 is one-eighth inch. The radius at the base of the groove at 156 is 0.024 inch. The inside and outside lip surfaces 134, 160 extend at an angle of 10° relative to the longitudinal axis of the valve head as measured at 162, 164, respectively. The outer edge of the lip is beveled at an angle of 60° as measured at 166. The diameter of the valve bore 138 is 1.070 ± .0005 inch. Thus, in the flexed stressed condition shown in FIG. 3 the flexible lip is inwardly deflected to provide a substantial axial length of engagement with the valve bore, as indicated at 168, with increasing outwardly directed resilient force in the flexible lip from the base of the lip at 156 to the tip of the lip at 150. As a result, wear of the surface 134 does not cause failure of the valve head due to leakage of air past the sealing lip. Instead, the sealing lip provides self-compensating wear means whereby wear due to such factors as misalignment and sliding friction of the poppet valve head in the valve bore is automatically self-compensated by the resiliently inwardly flexed lip structure. Poppet valve heads having this lip structure have been cycled in an air system without lubrication more than 70 million times without failure which is 10 or more times the average life expectancy of prior art devices.

The angle 164 of the outer lip surface determines the amount of surface engagement between the valve head and the bore wall. At an angle of 25°, which is believed to be approximately the maximum angle providing sufficient surface engagement for self-adjusting wear compensation, the theoretical axial length of surface engagement in the illustrative valve embodiment is approximately 0.070 inch. At an angle of 7.20, which is believed to be approximately the minimum angle providing sufficient flexibility and fatigue strength in the lip, the theoretical axial length of surface engagement in the illustrative valve embodiment is approximately 0.265 inch. By way of example, at an intermediate angle of 16°, the theoretical axial length of surface engagement is approximately 0.113 inch.

The dimensional characteristics of the flexible lip may vary within the limits required for the necessary strength, resilience, and flexibility. In the illustrative valve embodiment the thickness of the lip probably should be less than approximately 0.090 and greater than 0.040 inch. The axial length of the lip probably should be less than approximately three-eighth inch and greater than approximately one-eighth inch. The maximum outside diameter of the lip probably should be less than approximately 1.16 inch and greater than approximately 1.11 inch. While these dimensional characteristics are based upon a particular bore size, i.e. 1.070 in the illustrative embodiment, the general relationship of the various dimensions illustrates the necessary dimensional requirements to achieve the exceptional results of the present invention and are believed to be generally relatively applicable to other specific embodiments.

It is intended that the claims appended hereto be construed to cover variations of the illustrative embodiment which embody the inventive principles herein disclosed except insofar as limited by the prior art.

I claim:

1. In the combination of a movable valve head and valve bore for use in an industrial air control system to control the flow of high pressure air by sliding axial movement of the valve head within and parallel to the longitudinal axis of the valve bore between open and closed positions relative to an air flow path and comprising an annular valve bore having a longitudinal axis and a transverse wall at one end, a one-piece annular valve body of self-lubricating flexible polymer plastic material, a transverse surface on one end of said valve body located opposite said transverse wall of said valve bore and defining a pressure chamber therebetween, an undercut annular groove in said valve body opening at one end toward and into said pressure chamber and extending generally axially away from said transverse surface and said transverse wall into said valve body from a position adjoining said transverse surface and being closed and centrally terminating at the opposite end in said valve body, an annular sleeve-like flexible sealing lip integrally formed on said valve body by said undercut annular groove and extending circumjacent and generally axially relative to said valve body toward said transverse surface and said pressure chamber, an outer sealing surface on said sealing lip extending generally axially toward said transverse surface and said pressure chamber and being outwardly inclined relative to the longitudinal axis of said valve, and the diameter and the length and the angle of inclination of the sealing lip relative to the valve bore being such as to resiliently inwardly displace the sealing lip toward the valve body and form a self-adjusting axially extending cylindrical band of surface engagement between the sealing lip and the valve bore, said band extending axially a substantial length so as to maintain an effective seal notwithstanding the eventual wearing away of portions of the sealing lip forming said band, the axial length of said sealing lip from the closed end to the open end of said groove being less than the axial length of said valve body from the closed end of said groove to said transverse surface whereby said lip terminates axially inwardly a substantial distance from said surface.

2. The invention as defined in claim 1 and the angle of inclination of the sealing lip being approximately between 7° and 25°.

* * * * *